Jan. 31, 1933.  W. R. GRISWOLD  1,896,024
INTERNAL COMBUSTION ENGINE
Original Filed Nov. 3, 1926
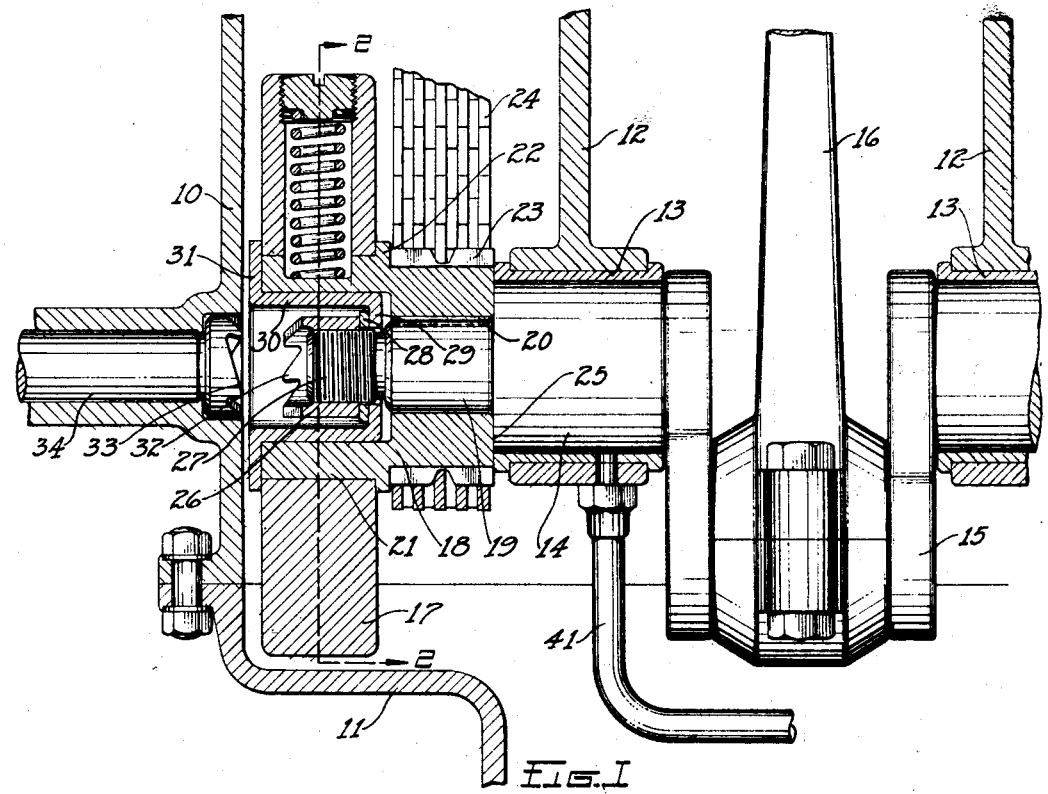
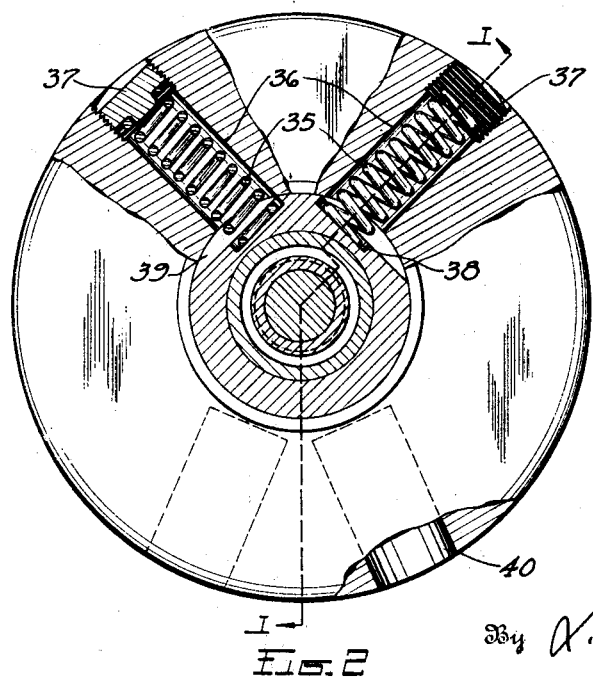
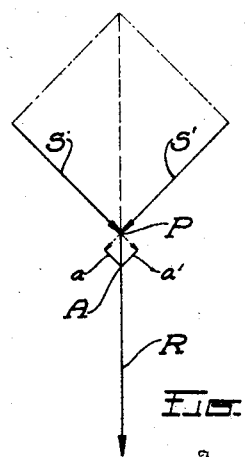
Inventor
WALTER R. GRISWOLD.
By *L. A. Wright*
Attorney Patented Jan. 31, 1933

1,896,024

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed November 3, 1926, Serial No. 146,056. Renewed March 5, 1932.

This invention relates to internal combustion engines and particularly to means for damping torsional vibration of the crankshafts of such engines.

It is well known that objectionable vibrations of this character occur in certain types of engines, and particularly in those having long crankshafts which are operated over a wide range of speeds, such as the well known automobile engines. The vibrations may be of various magnitudes, and may be objectionable solely because of the unpleasant effect on the senses, or they may be so severe as to be destructive to engine parts.

The crankshaft and associated flywheel of such an engine constitute a torsionally elastic system which, like all similar systems, has one or more nodes of vibration. The vibrations may be classified in degrees according to the shape of the elastic curve, the number of nodal points in such curve determining whether the vibration is of the first degree, second degree, etc. The higher degrees of vibration thus have a greater number of nodes and consequently much higher frequencies than the lower degrees, but the system will vibrate when any applied torque is in synchronism with any one of its natural frequencies.

When such an engine is running the crankshaft is subjected to periodic torque forces which are caused by the gas pressure on the pistons and by the inertia of the connecting rods and their associated parts. Such torque forces may be resolved into a series of harmonic components, hereinafter called "harmonics", which may be arranged in a series of orders according to the number of complete cycles of the harmonic force during one revolution of the crankshaft. The total torque effort then is the combined effect of all the harmonics due to gas pressure and all the harmonics due to inertia forces. It is evident that the torque effort caused by a gas pressure harmonic and the torque effort caused by an inertia force harmonic of the same order may be combined into a resultant torque effort, and in general all harmonics of like order may be directly combined into a resultant harmonic of the same order.

The period of any of these harmonics is equal to the reciprocal of the product of engine speed and order number, and the speed of the engine therefore determines this period. At certain speeds of the shaft, called critical speeds, its natural period is equal to the period of a given harmonic, and the exciting force, which in this case is the particular harmonic torque, will synchronize with the motion of the shaft so as to continuously add energy to it. Thus a condition of resonance is produced which adds to the total energy of the vibrating system and as the amplitude for any node of vibration is proportional to the total energy of the system, torsional vibration of greater or less severity is the result.

At the beginning of any such torsional vibration, the damping forces which are inherent in the engine, such as hysteresis and mechanical friction, exert their influence and prevent the amplitude of vibration from becoming indefinitely large. The inherent damping action in any given engine is, however, usually too small to restrict the vibration to desirable limits at all the critical speeds. As long as the shaft with its associated parts, is strong enough to withstand the stress of vibration, the amplitude at any critical speed will grow until the energy input is equal to the energy rejection of damping. The energy input is necessarily proportional to the magnitude of the resultant harmonic torque, which decreases rapidly with increase of order, so that the vibrations caused by harmonics of high order are usually very feeble and may be neglected, often being practically damped out by the inherent damping forces of the engine. The magnitude of the vibrations resulting from the lower order harmonics is, however, considerable, and these are the ones which are seriously objectionable. These vibrations can be controlled only by rejecting energy from the system at a rate sufficient to prevent increase of the total energy therein.

Various forms of means for the control of such vibrations have been heretofore proposed, and these devices must of necessity and in point of fact do operate on this principle of energy rejection, which principle is of course based on the fundamental law of the conservation of energy. In the pioneer device for controlling such vibrations an inertia member is mounted on the end of the engine crankshaft remote from the flywheel and has a friction connection with the crankshaft such that the friction opposes relative movement between these parts. By the action of this connection, part of the energy of a vibration occurring in the shaft is transformed by the friction into heat and dissipated by radiation from the system, thus decreasing the total energy thereof and damping the vibration.

Since the aforesaid pioneer invention, the improvers have all operated along this same line though the structures have necessarily differed. In some of the improved devices the energy is dissipated through special friction members. It has also been heretofore proposed to provide a device of this character wherein the energy is dissipated through friction in the bearings of the inertia member and hysteresis in associated springs, such a device operating on the principle of energy dissipation just as do the other prior art devices referred to. While it has been proposed to neutralize the crankshaft vibrations by impressing upon the shaft other vibrations which are induced in the inertia member of the device and which are out of phase with the shaft vibrations, torsional vibrations cannot be damped in any way inconsistent with the universal law of the conservation of energy. Damping effect must be derived from the mechanical friction which is necessarily present in the bearing surfaces and in the spring leaves and seats and from hysteresis in the springs themselves, this mechanical friction and hysteresis resulting in the dissipation of energy in the form of heat in exactly the same manner that energy is dissipated in the other damper constructions of the prior art. Otherwise the critical speeds of the engine would be merely lowered. Were there no friction there would be no damping.

To further explain, in accordance with the recognized laws which govern the vibration of all undamped elastic systems, when mass is added or the elasticity of the system is increased, the result is a new system having characteristics different from the original system. Such new system will vibrate at a different frequency, the period of vibration being longer than in the original system and the frequencies being correspondingly lower. This means that by making such changes the locations of vibrations in the engine speed range may be changed, and it may even be possible, in engines operating on narrow speed ranges, to so lower a critical speed that it will be outside of the operating range of the engine. However, this shifting of the critical speed does not destroy or neutralize the vibrations, it merely moves them to a point where the engines do not operate to produce them, and consequently the mere addition of mass or increase of elasticity in an internal combustion engine crankshaft such as used in motor vehicles would have no practical value. Hence a device of the construction under consideration produces friction, damping friction, and is effective because there is mechanical friction in the heavily loaded bearings, in the spring leaf surfaces and on the spring seats, and because there is hysteresis in the springs themselves. Hence there is dissipation of energy in the form of heat and here is a certain amount of control of torsional vibration in the crankshaft. The control of torsional vibration is possible only by external damping.

It is one of the objects of the present invention to provide a novel form of torsional vibration damping means of the oscillating type.

Another object of the invention is to provide a vibration damper which shall be simpler in structure, easier to manufacture and less expensive than dampers previously proposed, and which shall likewise be effective to control vibrations over the entire speed range of the engine.

Another object of the invention is to provide a vibration damper which shall be inherently in static balance and which shall not require the provision of counter-weights or other deformation of the shaft to maintain the balance thereof.

A further object of the invention is to provide a damper in which the damping effect shall be a maximum in a device of moderate size and weight.

Other objects of the invention will appear from the following description taken in connection with the drawing, which forms a part of this specification, and in which:

Fig. 1 is a vertical longitudinal section through a portion of an internal combustion engine embodying the invention, the section being substantially on the line 1—1 of Fig. 2;

Fig. 2 is a transverse section substantially on the line 2—2 of Fig. 1; and

Fig. 3 is a diagram of some of the forces acting on the damper shown in Figs. 1 and 2.

Referring to the drawing, 10 represents the crank case of an internal combustion engine having a removable lower cover or oil pan 11 and provided with transverse webs 12. These webs support suitable alined bearings 13 for a motor crankshaft 14, the latter having the usual integral cranks 15, each of which is connected by a connecting rod 16 with a piston mounted in one of the engine cylinders, the piston and cylinders not being shown in the drawing but being of the usual construction.

The damping means of this invention is illustrated as mounted at or adjacent the end of the crankshaft 14. It is in the form of a cylindrical inertia member 17 which is mounted co-axially with the crankshaft and upon a suitable bearing part thereof. As shown, this bearing part is a member 18 formed separately from the crankshaft but supported upon and keyed to the reduced end 19 thereof as by a key 20. The bearing portion of this member 18 is indicated at 21 and the inertia member 17 is adapted to fit on this bearing portion 21 for rotative movement thereon and to rest against a shoulder 22 formed on the member 18. Another portion of the member 18 is in the form of a gear or sprocket 23 which drives a chain 24 by means of which the engine camshaft, the generator, and other engine accessories may be driven. One end of the member 18 preferably abuts against a shoulder 25 formed by reducing the end of the shaft and it is retained on the shaft in its keyed relation thereto by a nut 26 on the threaded end 27 of the crankshaft. The nut operates through a washer 28 against the inner flange 29 of a sleeve 30, which sleeve has an outer flange 31 pressing against the outer end of the member 18 and extending radially far enough to hold the inertia member 17 on its bearing. Thus the entire member 18 turns with the crankshaft as a part thereof and of course its bearing portion 21 and the gear or sprocket 23 turn with it. The inertia member 17, however, is free to turn on the bearing portion 21 except as is hereinafter described.

The end of the nut 26 is preferably formed with clutch teeth 32 which may be engaged with similar teeth 33 on an endwise movable starter shaft 34. This is the usual hand starting crank for manually rotating the crankshaft for starting.

For the purposes of this invention the inertia member 17 is yieldingly urged to a neutral position and frictionally retarded in its rotation or in its oscillations by means or devices mounted in the inertia member itself and abutting against a crankshaft part. As shown, this means comprises coil springs 35 arranged in suitable drilled recesses or chambers 36 in the inertia member. These springs are under considerable initial load. The recesses 36 extend somewhat but not exactly radially, their axes forming equal angles with a reference or neutral plane through the crankshaft axis, this plane being vertical in the position of the crankshaft shown in the drawing.

Plugs 37 are adjustably connected as by threading in the outer ends of the recesses 36 so that the compression of the springs may be adjusted. At their inner ends the springs abut directly against seats or depressions 38 that are formed within the circumference of the bearing portion 21 of the member 18. The bottoms of these seats are normal to the axes of the respective recesses 36, and preferably the bearing is cut away slightly above the bottoms of the seats as shown at 39 to allow for clearance of the springs as the inertia member oscillates.

In order that the inertia member may be self contained and of itself in static balance when placed on the crankshaft, some of its metal body is cut away as by forming the recesses 40 in the side of the member opposite the recesses 36. This makes it unnecessary to provide additional balance weights on the crankshaft to counteract unbalance in the damper.

With the above construction it is evident that the springs 35 will tend to urge the inertia member 17 to a neutral position and their pressure may be adjusted, both to change the spring action and to equalize it, by moving the plugs 37 in or out as required.

The angle formed by the spring axes is such that these axes intersect at a point P removed from the crankshaft axis A, so that each of the springs exerts a turning moment $Sa$, or $S'a$, (Fig. 3) which tends to rotate the inertia member 17 with respect to the crankshaft. These moments are equal and opposite so that the springs 35 constitute resilient means urging the inertia member toward its neutral position with respect to the crankshaft, tending to return it to such position after it has been displaced by an oscillating movement on its bearing, and tending to create friction between the inertia member and its bearing so that the oscillations of the inertia member are considerably retarded.

Suitable lubricating means may be provided for the various bearings of the crankshaft as by a pipe 41 leading oil under pressure to one of the bearings 13 and from this bearing the oil may be led through suitable passages to the bearing 21.

The inertia member 17 normally occupies a neutral position with respect to the crankshaft 14, in which position it is illustrated in the drawing, and when the engine is running steadily at uniform velocity it is carried around with the shaft substantially in this neutral position. It is capable, however, of limited rotative or oscillatory movement on the crankshaft, and this movement is constantly opposed by the springs and by the friction produced by the springs. One of the springs will be more compressed upon movement of the inertia member 17 in one direction and the other spring will be more compressed when the movement is in the other direction. The springs thus act to urge the inertia member at all times towards its neutral position and serve to return it to the neutral position after any departure therefrom as the force which caused the movement is removed. They also serve as stops to limit the extent to which the inertia member may oscillate.

As has been said, movement of the inertia member on its bearing is also opposed by the frictional resistance between these members, and this resistance is proportional to the pressure between the bearing surfaces. This resistance is produced by the combined pressures S and S' of the springs, the resultant R of which is exerted radially between the inertia member and the bearing. The energy dissipated in the form of heat by reason of this friction represents the major portion of the output energy of damping.

The operation may be described as follows: When the crankshaft is rotating smoothly at a uniform velocity, the weight or inertia member is carried along with it so that there is little or no relative movement of this member with respect to the shaft. Upon the inception of a torsional vibration, however, the motion of the shaft changes and it is subjected to the alternating forward and backward rotating movements of relatively small amplitude and high frequency, which constitute the vibratory disturbance and which are superposed on the continuous forward rotary movement of the shaft. The shaft, by reason of these alternating movements, has high accelerations which are alternately positive and negative, and the weight member, having considerable inertia, cannot follow these alternations but tends to continue its unidirectional rotation. Hence, there is slippage between this member and its bearing, so that it has a movement relative to the shaft. This movement is oscillatory in character, corresponding to the vibratory alternations of movement of the shaft, and it takes place against the spring pressure and the frictional drag at the bearing as explained above. The energy necessary to cause this alternating movement of the inertia member against the frictional drag is subtracted from the energy of the vibration with the result that the amplitude of this disturbance is controlled so that the vibration is unobjectionable.

The damping effect may be increased by increasing the angle through which the inertia member is permitted to oscillate, since this increases the distance through which the frictional force acts and consequently the amount of work done in this manner. By the use of inertia members of adequate weight together with springs of proper strength, the frictional dissipation of energy may be made sufficient to damp vibration of any magnitude encountered in practice in any and all parts of the engine speed range. At the same time the physical size of the damper may be kept within reasonable limits.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination in an internal combustion engine having a crankshaft, of a vibration damper comprising a bearing member co-axially secured to said shaft, an inertia member mounted on said bearing member for limited oscillatory movement with respect to the shaft, and springs therebetween acting to increase the bearing pressure between the bearing and inertia members and to urge the latter toward its neutral position with respect to the crankshaft.

2. The combination in an internal combustion engine having a shaft, of a mounting carried by the shaft at the end thereof, an inertia member journaled on said mounting co-axially with the shaft, and spaced springs therebetween adapted to exert equal and opposite moments, each tending to turn the inertia member on the mounting, the combined pressure of said springs acting to increase the frictional resistance to such turning.

3. The combination in an internal combustion engine having a crankshaft, of an axially projecting bearing member at the forward end of said shaft having adjacent faces disposed at an angle, an inertia member journaled on the bearing member and having bored recesses disposed substantially radially of the member and normal to said faces, adjustable abutments in said recesses near the outer ends thereof, and a spring in each recess between the adjacent face and the abutment, said springs tending to prevent oscillatory movement of the inertia member and increasing the frictional resistance to such movement.

4. In an internal combustion engine, the combination of a crankshaft, and means for damping torsional vibrations thereof comprising an inertia member having a co-axial bearing thereupon and adapted to oscillate in response to shaft vibrations, and devices co-acting with said bearing for yieldingly urging the inertia member to a neutral position and frictionally retarding, and limiting the amplitude of, the oscillations of said member.

5. In an internal combustion engine, the combination of a crankshaft, and means for damping torsional vibrations thereof comprising an inertia member having a co-axial bearing thereupon and adapted to oscillate in response to shaft vibrations, and devices co-acting with said bearing for yieldingly urging the inertia member to a neutral position and frictionally retarding the oscillations of said member.

6. In an internal combustion engine, the combination of a crankshaft, and means for damping torsional vibrations thereof comprising an inertia member having a co-axial bearing thereupon and adapted to oscillate in response to shaft vibrations, and devices co-acting with said bearing for frictionally retarding, and limiting the amplitude of, the oscillations of said member.

7. In an internal combustion engine, the combination of a crankshaft, and means for damping torsional vibrations thereof comprising an inertia member having a co-axial bearing thereupon and adapted to oscillate in response to shaft vibrations, and springs constituting resilient means urging the inertia member towards its neutral position with respect to the crankshaft, tending to return it to such position after it has been displaced by an oscillating movement on its bearing, and tending to create friction between the inertia member and its bearing so that the oscillations of the inertia member are considerably retarded.

8. In an internal combustion engine, the combination of a crankshaft, and means for damping torsional vibrations thereof comprising an inertia member having a bearing thereon and adapted to oscillate in response to shaft vibrations, and devices co-acting with said bearing for yieldingly urging the inertia member to a neutral position and frictionally retarding, and limiting the amplitude of, the oscillations of said member, said inertia member and said devices being balanced on the axis of oscillation of said member.

9. In an internal combustion engine, the combination of a crankshaft and means for damping torsional vibrations thereof comprising an inertia member of cylindrical form having a co-axial bearing on said crankshaft and adapted to oscillate thereon in response to shaft vibrations, said member having recesses therein forming equal angles with a reference or neutral plane through the crankshaft axis, springs in said recesses acting against an offset part of the crankshaft to yieldingly retain the inertia member in a neutral position, said springs acting to frictionally retard the oscillations of the inertia member.

10. In an internal combustion engine, the combination of a crankshaft having an exterior bearing portion at its end, said portion having spring seats formed within its surface, an inertia member mounted to rotate on said bearing portion in the zone of said seats, said inertia member having recesses therein, and springs in said recesses bearing at one end against the inertia member and at the other end directly against the seats in said crankshaft bearing portion.

11. In an internal combustion engine, the combination of a crankshaft, a bearing member secured upon the end of said crankshaft and having a bearing portion, an inertia member mounted for rotation upon said bearing portion, and springs in said inertia member acting directly against said bearing portion to yieldingly urge the inertia member to a neutral position and to frictionally retard the oscillations of said inertia member.

12. In an internal combustion engine, the combination of a crankshaft having a bearing portion at one end thereof, springs seats formed within the circumference of said bearing portion, an inertia member mounted for oscillation upon said bearing portion, and springs under initial compression mounted within said inertia member having their ends resting in said spring seats for yieldingly retaining the inertia member in a neutral position and increasing the frictional resistance of the bearing to oscillations of the inertia member.

13. In a vibration damper for a crankshaft, the combination with an inertia member mounted for oscillation with respect to the crankshaft about the crankshaft axis, and means including a pair of yielding devices acting between the crankshaft and said inertia member and exerting thrust in directions inclined oppositely with respect to the radial to yieldingly urge the inertia member to a neutral position.

14. In a vibration damper for a crankshaft, the combination with an inertia member mounted for oscillation with respect to the crankshaft about the crankshaft axis, and means including a pair of yielding devices acting between the crankshaft and said inertia member and exerting thrust in directions inclined oppositely with respect to the radial to yieldingly urge the inertia member to a neutral position, said devices being located on one side of the crankshaft axis only, whereby an unbalanced thrust is exerted on said inertia member serving to develop friction in the mounting therefor and retard oscillatory movement thereof.

15. In a vibration damper for crankshafts, the combination with an inertia member, of means carried by said shaft and forming a co-axial journal for said member, whereby said member may oscillate in response to vibrations induced in the shaft, and resilient means for urging said member in a direction radial to the shaft to increase the friction between said first named means and said member for retarding oscillation of said member.

In testimony whereof I affix my signature.

WALTER R. GRISWOLD.